(12) United States Patent
Wakamatsu et al.

(10) Patent No.: US 7,851,405 B2
(45) Date of Patent: Dec. 14, 2010

(54) EXHAUST GAS PURIFYING CATALYST AND MANUFACTURING METHOD THEREOF

(75) Inventors: Hironori Wakamatsu, Yokohama (JP); Maki Shimada, Yokohama (JP); Masanori Nakamura, Yokosuka (JP); Katsuo Suga, Yokohama (JP); Hiroto Kikuchi, Hiratsuka (JP); Tetsuro Naito, Yokohama (JP); Toshiharu Miyamura, Yokohama (JP); Jun Ikezawa, Yokosuka (JP)

(73) Assignees: Nissan Motor co., Ltd., Yokohama-shi (JP); Renault s.a.s., Boulogne-Billancourt (FR)

(*) Notice: Subject to any disclaimer, the term of this patent is extended or adjusted under 35 U.S.C. 154(b) by 11 days.

(21) Appl. No.: 12/010,514

(22) Filed: Jan. 25, 2008

(65) Prior Publication Data

US 2008/0187714 A1  Aug. 7, 2008

(30) Foreign Application Priority Data

Jan. 25, 2007 (JP) ............... 2007-015158
Apr. 20, 2007 (JP) ............... 2007-112313
Sep. 12, 2007 (JP) ............... 2007-237100

(51) Int. Cl.
- *B01J 23/56* (2006.01)
- *B01J 23/44* (2006.01)
- *B01J 23/42* (2006.01)
- *B01J 23/10* (2006.01)
- *B01J 23/00* (2006.01)
- *B32B 3/12* (2006.01)

(52) U.S. Cl. ............... 502/332; 502/333; 502/334; 502/302; 502/303; 502/304; 502/325; 502/339; 428/117

(58) Field of Classification Search ............... 428/117; 502/302, 303, 304, 325, 339, 330, 332, 333, 502/334
See application file for complete search history.

(56) References Cited

U.S. PATENT DOCUMENTS

| | | | |
|---|---|---|---|
| 6,335,305 B1 | 1/2002 | Suzuki et al. | |
| 7,041,263 B2 * | 5/2006 | Sung | 423/239.1 |

FOREIGN PATENT DOCUMENTS

| | | | |
|---|---|---|---|
| EP | 1 241 329 A2 | | 9/2002 |
| EP | 1 563 893 A1 | | 8/2005 |
| EP | 1 598 104 A1 | | 11/2005 |
| EP | 1 859 851 A1 | | 11/2007 |
| EP | 1 944 082 A1 | | 7/2008 |
| EP | 1952876 | * | 8/2008 |
| EP | 1 980 318 A2 | | 10/2008 |
| JP | 8-131830 A | | 5/1996 |
| JP | 2003-117393 | | 4/2003 |
| JP | 2005-000829 | | 1/2005 |
| JP | 2005-000830 | | 1/2005 |
| JP | 2005-262201 A | | 9/2005 |
| WO | WO 2006/025613 A1 | | 3/2006 |
| WO | WO 2007/145350 A1 | | 12/2007 |

* cited by examiner

*Primary Examiner*—Timothy C Vanoy
*Assistant Examiner*—Daniel Berns
(74) *Attorney, Agent, or Firm*—Foley & Lardner LLP

(57) ABSTRACT

An exhaust gas purifying catalyst that includes noble metal particles, first compounds which support the noble metal particles and suppress movement of the noble metal particles, and second compounds which encapsulate the noble metal particles and the first compounds. The second compounds suppress the movement of the noble metal particles and suppress coagulation of the first compounds following mutual contact of the first compounds.

21 Claims, 4 Drawing Sheets

CeMgOx-SERIES

ZrCeLaOx-SERIES

EXHAUST GAS PURIFYING CATALYST AND MANUFACTURING METHOD THEREOF

BACKGROUND OF THE INVENTION

1. Field of the Invention

The present invention relates to an exhaust gas purifying catalyst suitable for application to treatment for purifying exhaust gas discharged from an internal combustion engine, and to a manufacturing method thereof.

2. Description of the Related Art

Up to present, as catalyst activators of a three-way catalyst capable of simultaneously purifying carbon monoxide (CO), hydrocarbon (HC) and nitrogen oxide (NOx), which are contained in exhaust gas, noble metals such as platinum (Pt), rhodium (Rh) and palladium (Pd) have been widely known. Moreover, exhaust gas purifying catalysts, in which these noble metals are supported on supports of oxides, for example, such as alumina, zirconia and titania, have been widely known. These exhaust gas purifying catalysts are formed by being coated on surfaces of inner walls of a honeycomb base member made of cordierite or the like, and purify the exhaust gas introduced into the honeycomb base member from an internal combustion engine.

Moreover, as the exhaust gas purifying catalyst, there is one to which a promoter component is added in order to enhance catalytic performance. This promoter component is, for example, an oxide of transition metal. The promoter component is added so as to contact or come close to particles of the noble metal as the catalyst activator, and thereby exerts a function as an active site, thus making it possible to enhance catalytic activity.

In recent years, on the background where outputs of gasoline engines have been enhanced and high-speed running has been increased, a temperature of the exhaust gas of automobiles has tended to rise. Moreover, at the time when such an engine starts, in order to rapidly raise a temperature of the honeycomb base member to a temperature at which the exhaust gas purifying catalyst is capable of purifying the exhaust gas, the honeycomb base member in which the exhaust gas purifying catalyst is formed is disposed immediately under the engine. From these facts, the exhaust gas purifying catalyst has come to be used in a higher temperature range than heretofore.

The conventional catalyst is poor in durability in the actual exhaust gas, and in some cases, grain growth has occurred in the noble metal itself owing to the high temperature, and the activity thereof has been decreased.

In the exhaust gas purifying catalyst added with the promoter component, the promoter component is disposed in the vicinities of noble metal particles, thus making it possible to suppress atmospheric variations around the noble metal particles by the transition metal or a transition metal compound. From this fact, an attempt to enhance durability of the noble metal particles in the actual exhaust gas has been made (refer to Japanese Patent Laid-Open Publications No. H8-131830 (published in 1996), No. 2005-000829, No. 2005-000830 and No. 2003-117393). Note that, in accordance with such measures as disclosed in the publications, enhancement of the activity of the noble metal particles can also be expected in addition to the enhancement of the durability of the noble metal particles.

SUMMARY OF THE INVENTION

However, in the case of an exhaust gas purifying catalyst in which the promoter component is disposed in the vicinities of the noble metal particles, which is manufactured by using a general impregnation method, the noble metal particles and the promoter component are prone to be coagulated in a manufacturing process. As a result, a state is brought about, where particles of the promoter component are prone to be thermally coagulated. From this fact, it is difficult to expect the enhancements of the durability and activity of the catalyst.

Moreover, in the case of an exhaust gas purifying catalyst in which the noble metal particles are supported on alumina widely used as a metal oxide support, the noble metal particles move in a high-temperature atmosphere, and the noble metal particles contact each other, whereby the noble metal particles are coagulated. Moreover, since the transition metal compound is prone to be solid-solved into the alumina, it is difficult to obtain an effect of enhancing the activity of the noble metal particles only by merely disposing the transition metal compound in the vicinities of the noble metal particles.

Furthermore, in the case of an exhaust gas purifying catalyst in which the alumina that supports the noble metal particles is coated with ceria ($CeO_2$), though the movement of the noble metal particles is suppressed, the catalytic activity is decreased at the high temperature since this ceria is poor in durability. Accordingly, it has been difficult to enhance the durability and activity of the catalyst.

An exhaust gas purifying catalyst according to the present invention is summarized to include: noble metal particles; first compounds which contact the noble metal particles and suppress movement of the noble metal particles; and second compounds which encapsulate the noble metal particles and the first compounds, suppress the movement of the noble metal particles, and suppress the coagulation of the first compounds following mutual contact of the first compounds, wherein the first compounds support the noble metal particles, and a single piece or aggregate of the first compounds which support the noble metal particles are included in a section partitioned from the others by the second compounds, and the first compounds are a composite containing a rare earth element.

Moreover, a manufacturing method of an exhaust gas purifying catalyst according to the present invention is summarized to include: sintering the first compounds in advance, and then supporting the noble metal particles on the first compounds; milling the first compounds on which the noble metal particles are supported; and forming second compounds on peripheries of the milled first compounds on which the noble metal particles are supported.

BRIEF DESCRIPTION OF THE DRAWINGS

The above and further objects, features and advantages of the invention will more fully appear in the detailed description of embodiments of the invention, when the same is read in conjunction with the drawings, in which.

DETAILED DESCRIPTION OF THE INVENTION

A description will be made below of embodiments of an exhaust gas purifying catalyst of the present invention while using the drawings.

Figure 1:
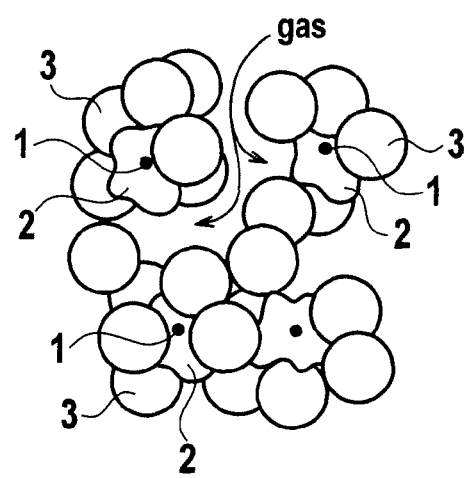
FIG. 1 is a schematic view showing a configuration of an exhaust gas purifying catalyst that becomes an embodiment of the present invention.

FIG. 1 is a schematic view of an exhaust gas purifying catalyst that becomes an embodiment of the present invention. The exhaust gas purifying catalyst of this embodiment, which is shown in FIG. 1, is composed of: noble metal particles 1 having catalytic activity; first compounds 2 which contact the noble metal particles 1 and suppress movement of the noble metal particles 1; and second compounds 3 which encapsulate the noble metal particles 1 and the first compounds 2, suppress the movement of the noble metal particles 1, and suppress the coagulation of the first compounds 2 following mutual contact of the first compounds 2. Moreover, the second compounds are formed on the peripheries of the first compounds 2 which support the noble metal particles 1, whereby a single piece of the first compound 2 that supports the noble metal particle 1 or an aggregate of plural pieces of the first compounds 2 is included in a section partitioned from the others by the second compounds 3.

In the exhaust gas purifying catalyst of this embodiment, which is shown in FIG. 1, as described above, the first compounds 2 contact the noble metal particles 1, and support the noble metal particles 1. As described above, the first compounds 2 support the noble metal particles 1, whereby the first compounds 2 are chemically bonded to the noble metal particles 1. Therefore, the first compounds 2 function as anchor members of the noble metal particles 1, and suppress the movement of the noble metal particles 1. Such chemical suppression of the movement of the noble metal particles 1, which is as described above, contributes to suppression of coagulation of the noble metal particles 1.

Moreover, the exhaust gas purifying catalyst of this embodiment has a form in which the first compounds 2 which support the noble metal particles 1 are covered with the second compounds 3, and are encapsulated therein. From this fact, the second compounds 3 physically suppress the movement of the noble metal particles 1. Such physical suppression of the movement of the noble metal particles 1, which is as described above, contributes to the suppression of the coagulation of the noble metal particles 1.

Furthermore, in the sections partitioned by the second compounds 3, the noble metal particles 1 and the first compounds 2, which are encapsulated therein, are included, whereby the first compounds 2 are suppressed from contacting one another and from being coagulated beyond the sections partitioned by the second compounds 3. Such suppression of the coagulation of the first compounds 2, which is as described above, contributes to the suppression of the noble metal particles supported on the first compounds 2.

From these facts, in the exhaust gas purifying catalyst of the present invention, the coagulation of the noble metal particles 1 is suppressed without increasing manufacturing cost and an environmental load, and hence, a decrease of the catalytic activity owing to the coagulation of the noble metal particles 1 can be prevented. Moreover, the coagulation of the first compounds 2 as a promoter can be suppressed by the second compounds 3. In addition, an appropriate positional relationship is established between the noble metal particles 1 and the second compounds, and accordingly, an effect of enhancing the activity of the noble metal particles 1, which is brought by the first compounds 2, can be maintained.

In the exhaust gas purifying catalyst of the present invention, a composite containing a rare earth element can be used as the first compounds 2. As the first compounds 2 which enable, as the anchor members, the suppression of the movement and coagulation of the noble metal particles 1, the composite containing the rare earth element is used, whereby the first compounds 2 are enabled to exhibit a high affinity with the noble metal particles 1, and as a result, the noble metal particles 1 can be effectively suppressed from moving from the first compounds 2 toward the second compounds 3. Therefore, the noble metal particles 1 are stabilized on the first compounds 2, and do not move to the second compounds 3 even under a high-temperature exhaust gas condition, and the coagulation of the noble metal particles is further suppressed, thus making it possible to maintain a noble metal particle diameter with approximately several nanometers. Owing to such effects of stabilizing the noble metal and maintaining the diameter of the noble metal particles at the nanometer order, durability of the catalyst can be enhanced, thus making it possible to maintain good catalytic performance even after exhaust durability testing. The fact that it is possible to maintain the good catalytic performance even after the exhaust durability testing leads to that it is possible to realize catalytic activity, which is required for an exhaust gas purifying catalyst of an automobile, with a less amount of the noble metal than heretofore, thus making it possible to reduce an amount of the noble metal for use in the exhaust gas purifying catalyst to a larger extent than heretofore.

As described above, the composite containing the rare earth element is used as the first compounds 2, whereby the noble metal particles 1 are suppressed from moving from the first compounds 2 toward the second compounds 3 and from being coagulated. Details of the reason for the above are not necessarily obvious; however, the reason is considered to be because, by applying, to the first compounds 2, such a compound of the rare earth element having a large amount of surface oxygen, the first compounds 2 form strong covalent bonding with the noble metal particles 1 while interposing the surface oxygen therebetween.

In the exhaust gas purifying catalyst of the present invention, it is suitable that the first compounds 2 be a composite containing the rare earth element and at least one of alkali metal and alkali earth metal. As the first compounds 2 which enable, as the anchor members, the suppression of the movement and coagulation of the noble metal particles 1, the composite containing the rare earth element and at least one of the alkali metal and the alkali earth metal is used, whereby the first compounds 2 are enabled to exhibit a high affinity with the noble metal particles 1, and as a result, the noble metal particles 1 can be effectively suppressed from moving from the first compounds 2 toward the second compounds 3. Therefore, the noble metal particles 1 are stabilized on the first compounds 2, and do not move to the second compounds 3 even under the high-temperature exhaust gas condition, and the coagulation of the noble metal particles 1 is further suppressed, thus making it possible to maintain the noble metal particle diameter with approximately several nanometers. Owing to such effects of stabilizing the noble metal and maintaining the diameter of the noble metal particles at the nanometer order, the durability of the catalyst can be enhanced, thus making it possible to maintain the good catalytic performance even after the exhaust durability testing. The fact that it is possible to maintain the good catalytic performance even after the exhaust durability testing leads to that it is possible to realize the catalytic activity, which is required for the exhaust gas purifying catalyst of the automobile, with a less amount of the noble metal than heretofore, thus making it possible to reduce the amount of the noble metal for use in the exhaust gas purifying catalyst to a larger extent than heretofore.

As described above, the composite containing the rare earth element and at least one of the alkali metal and the alkali earth metal is used as the first compounds 2, whereby the noble metal particles 1 are suppressed from moving from the first compounds 2 toward the second compounds 3 and from being coagulated. Details of the reason for the above are not necessarily obvious; however, the reason is considered to be because, by applying, to the first compounds 2, such a compound of the rare earth element having a large amount of the surface oxygen, the first compounds 2 form strong covalent bonding with the noble metal particles 1 while interposing the surface oxygen therebetween. Moreover, the reason is considered to be because, by the fact that at least one of the alkali metal and the alkali earth metal, which easily emit electrons, is contained in the first compounds 2, the electrons are released to the oxygen, and the above-described covalent bonding is further strengthened.

In the exhaust gas purifying catalyst of the present invention, it is also suitable that a composite containing the rare earth element and zirconium be used as the first compounds 2. As the first compounds 2 which enable, as the anchor members, the suppression of the movement and coagulation of the noble metal particles 1, the composite containing the rare earth element and the zirconium is used, whereby the first compounds 2 are enabled to exhibit a high affinity with the noble metal particles 1, and as a result, the noble metal particles 1 can be effectively suppressed from moving from the first compounds 2 toward the second compounds 3. Therefore, the noble metal particles 1 are stabilized on the first compounds 2, and do not move to the second compounds 3 even under the high-temperature exhaust gas condition, and the coagulation of the noble metal particles is further suppressed, thus making it possible to maintain the noble metal particle diameter with approximately several nanometers. Owing to such effects of stabilizing the noble metal and maintaining the diameter of the noble metal particles at the nanometer order, the durability of the catalyst can be enhanced, thus making it possible to maintain the good catalytic performance even after the exhaust durability testing. The fact that it is possible to maintain the good catalytic performance even after the exhaust durability testing leads to that it is possible to realize the catalytic activity, which is required for the exhaust gas purifying catalyst of the automobile, with a less amount of the noble metal than heretofore, thus making it possible to reduce the amount of the noble metal for use in the exhaust gas purifying catalyst to a larger extent than heretofore.

As described above, the composite containing the rare earth element and the zirconium is used as the first compounds 2, whereby the noble metal particles 1 are suppressed from moving from the first compounds 2 toward the second compounds 3 and from being coagulated. Details of the reason for the above are not necessarily obvious; however, the reason is considered to be because, by applying, to the first compounds 2, such a compound of the rare earth element having a large amount of the surface oxygen, the first compounds 2 form strong covalent bonding with the noble metal particles 1 while interposing the surface oxygen therebetween. Moreover, the reason is considered to be because, by adding Zr to the first compounds 2, such stability of the first compounds 2 as the anchor members is further enhanced, and as a result, the first compounds 2 are enabled to further exert the effect of stabilizing the noble metal. Furthermore, when the alkali element or the alkali earth element is not contained in the first compounds, a composition of such a rare earth element and such a Zr element in the anchor members is enriched with Zr, whereby the first compounds come to have a similar crystalline structure to that of zirconia, thus making it possible to further stabilize the first compounds.

Figure 2A:
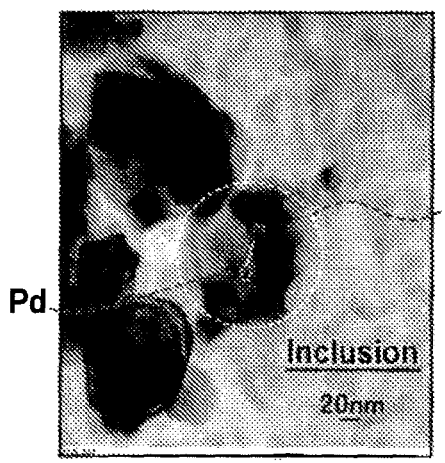
FIGS. 2A and 2B are pictures of metal structures, showing examples of the exhaust gas purifying catalyst according to the present invention.
Figure 2B:
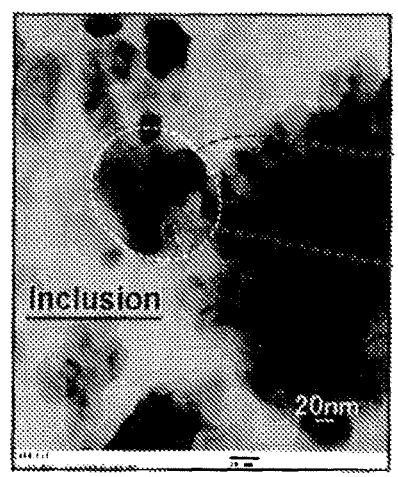

FIGS. 2A and 2B are examples of pictures of metal structures of the exhaust gas purifying catalyst according to the present invention. FIG. 2A is an example where the first compounds are the composite containing the rare earth and at least one of the alkali metal and the alkali earth metal, and specifically, is an example where the first compounds are CeMgOx-series compounds. FIG. 2B is an example where the first compounds are the composite containing the rare earth and the zirconium, and specifically, is an example where the first compounds are ZrCeLaOx-series compounds. As shown in these pictures, Pd particles as the noble metal particles are supported by the first compounds as the anchor members, and the second compounds as an inclusion material are formed so as to cover the first compounds which support the Pd particles.

In the exhaust gas purifying catalyst according to the present invention, it is preferable that the rare earth element in the composite as the first compounds 2 contain at least one selected from the group consisting of La, Ce, Pr and Nd. Each of La, Ce, Pr and Nd has high thermal stability and has high donating ability of the above-described surface oxygen, and accordingly, it becomes easier for the exhaust gas purifying catalyst to obtain the above-mentioned function and effect of the first compounds 2.

The rare earth element concerned in the composite as the first compounds 2 can further include Y. By the fact that Y is added, the exhaust gas purifying catalyst can further maintain an OSC function of the anchor members after the exhaust durability testing while maintaining the effect of maintaining microparticles of the noble metal (the diameter of the noble metal particles at the nanometer order). As a result, atmospheric variations caused in the case where an air fuel ratio (A/F ratio) is largely varied when the vehicle accelerates and decelerates during running can be relieved. As a result, it becomes possible to store and emit oxygen in and from such noble metal particles with a nanometer size, which become maintainable by this structure of the catalyst, and as a result, it becomes possible to further reduce exhaust gas emission, or alternatively, it becomes possible to further reduce the usage amount of noble metal.

The above-described effect obtained by adding Y is exerted particularly advantageously in the case where the first compounds 2 are the composite containing Zr. The catalyst according to this embodiment of the present invention has high heat resistance by itself; however, by combining Y therewith, the crystalline structure of the zirconia-series anchor members is stabilized, thus making it possible to further enhance the heat resistance. This is because phase transition is suppressed, in which the zirconia crystalline structure is deformed from tetragonal to monoclinic during the exhaust durability testing, and consequently, the OSC capability inherent therein can be suppressed from being decreased.

Moreover, when the above-described first compounds 2 contain at least one of the alkali metal and the alkali earth metal, it is preferable that the alkali metal or the alkali earth metal contain at least one selected from the group consisting of Na, K, Rb, Cs, Mg, Ca, Sr and Ba. It is particularly preferable that the first compounds 2 contain the alkali earth metal. Each of Na, K, Rb, Cs, Mg, Ca, Sr and Ba does not cause sublimation and has high thermal stability, and accordingly, it is considered that the above-mentioned electron donating ability thereof is stable. In particular, the alkali earth metal is likely to cause the composite with the rare earth element though the electron donating ability thereof is somewhat lower than that of the alkali metal, and accordingly, can form the first compounds as the composite having a high affinity with the noble metal particles.

In the case of containing the above-described rare earth element and at least one of the alkali metal and the alkali earth metal, the first compounds 2 can further contain Zr. The first compounds 2 contain Zr in addition to the rare earth element and at least one of the alkali metal and the alkali earth metal, whereby the first compounds 2 can impart a much higher oxygen storage capacity (OSC) to the exhaust gas purifying catalyst, and can further exert the effect. Moreover, Zr is further contained in the first compounds 2, and Zr and the first compounds 2 are complexed, thus making it possible to further extract the effect of stabilizing the nanoparticles as the noble metal particles. Details of the above are unknown; however, by the fact that the nanoparticles become maintainable, a contactable area of the noble metal particles with the exhaust gas is increased, and oxygen supply becomes necessary following such an increase, and in this case, Zr is contained in the first compounds 2, thus making it possible to allow the effect of stabilizing the nanoparticles (anchor effect) and an effect of smoothly supplying oxygen to the noble metal with a nanometer size to be compatible with each other.

It is preferable that the noble metal particles 1 supported on the first compounds 2 contain, as a component thereof, at least one selected from the group consisting of Pt, Pd and Rh. Each of Pt, Pd and Rh is a component having catalytic activity capable of purifying the exhaust gas. Moreover, each of Pt, Pd and Rh is noble metal that enables the first compounds 2 to fully exert the above-mentioned functions and effects, and is stabilized on the first compounds. The noble metal particles 1 contain at least one of Pt, Pd and Rh, and have a high affinity with the surface oxygen of the first compounds 2, and accordingly, the noble metal particles 1 do not move from the surfaces of the first compounds 2 to the second compounds.

It is more preferable that the noble metal particles 1 be Pd among Pt, Pd and Rh, which are described above. Pd is particularly effective as the noble metal that forms a combination with the first compounds 2 in the exhaust gas purifying catalyst of the present invention. The reason for the above is as follows. With regard to the above-mentioned effects of the first compounds 2, in particular, Pd has a high affinity with the first compounds 2, and accordingly, exerts the effects most in addition to an effect of suppressing embedment of the noble metal particles 1.

In the exhaust gas purifying catalyst of the present invention, the second compounds 3 are not particularly limited; however, it is desirable that the second compounds 3 be an oxide of at least one element selected from the group consisting of Al and Zr. Among them, the fact that the second compounds 3 are alumina is preferable since the second compounds 3 can be formed as a porous substance. The second compounds 3 are the porous substance, thus making it possible for the exhaust gas to pass through the second compounds 3 and to fully reach the noble metal particles 1 supported on the first compounds 2 in the structure of the exhaust gas purifying catalyst of the present invention.

It is more preferable that the second compounds 3 further contain at least one element selected from the group consisting of Ce, Zr, La and Ba in addition to the alumina. In order to stably maintain particles of the first compounds 2 which support the noble metal particles 1 in the exhaust gas purifying catalyst according to the present invention, the at least one element selected from the group consisting of Ce, Zr, La and Ba is added to the second compounds (inclusion material), thus making it possible to enhance heat resistance of the alumina as the inclusion material. In such a way, for example, in comparison with the case where the at least one element selected from the group consisting of Ce, Zr, La and Ba is not added, it becomes possible to suppress the conversion into α-alumina, which is a deteriorated state of the alumina, and consequently, it becomes possible to further enhance the durability of the catalyst having the structure according to the present invention. Moreover, when the noble metal particles 1 are Pd, there is a critical problem that the exhaust gas purifying catalyst is prone to be poisoned by HC and the like at the time of starting at a low temperature; however, such a poisoning function of HC is relieved by adding Ba to the second compounds, and as a result, it becomes also possible to achieve low-temperature activation of the exhaust gas purifying catalyst.

In the exhaust gas purifying catalyst according to the present invention, with regard to a crystallite diameter (D1) of the first compounds 2 of powder of the exhaust gas purifying catalyst and a secondary particle diameter (D2) of the first compounds on which the noble metal particles are supported, it is preferable that D2/D1 as a ratio of D2 with respect to D1 be $1 \leq D2/D1 \leq 50$. The first compounds 2 composed of the above-described composite have a high affinity with the noble metal, and accordingly, can maintain the state of the noble metal particles 1 with a nanometer size. However, when the first compounds 2 are coagulated at a high temperature, and are sintered, thereby turning to secondary particles, the noble metal particles 1 with a nanometer size, which are supported on the first compounds 2, are sometimes captured into the secondary particles of the first compounds 2. As a result, the number of noble metal particles contactable with the exhaust gas is decreased, and accordingly, there is an apprehension that the effect brought by maintaining the nanoparticles as the noble metal particles according to the present invention may be relatively faded.

In this connection, in order to suppress the embedment of the noble metal particles 1 into the first compounds 2, and to fully exert the effect of maintaining the nanoparticles as the noble metal particles 1, the secondary particle diameter D2 of the first compounds 2 on which the noble metal particles are supported is made not to be excessively larger than the crystallite diameter D1 of the first compounds 2. Specifically, the secondary particle diameter D2 of the first compounds 2 is made not to be excessively large even after the first compounds 2 are sintered. Specifically, D2/D1 as the ratio of D2 with respect to D1 is set within a range of: $1 \leq D2/D1 \leq 50$. By setting D2/D1 within this range, it becomes possible for the noble metal particles 1 to be exposed sufficiently on the surfaces of the secondary particles of the first compounds 2.

Describing in detail, in the exhaust gas purifying catalyst of the present invention, the first compounds 2 are encapsulated and fixed by the second compounds 3, and accordingly, do not move like bursting out of the second compounds 3. Therefore, in the case of being coagulated and sintered, the first compounds 2 are sintered only as the secondary particles in the sections encapsulated in the second compounds 3. Therefore, in order that the noble metal particles 1 supported on the first compounds 2 cannot be embedded in the secondary particles as the first compounds 2, it is ideal and the most preferable that each of the secondary particles as the first compounds 2 in the sections encapsulated in the second compounds 3 be in a state of the primary particle as one crystal, that is, D2/D1 be equal to 1 (a relation of: D2/D1<1 is impossible). Moreover, when a value of D2/D1 exceeds 50, the noble metal particles 1 are capable of maintaining the state of the nanoparticles; however, the noble metal particles 1 are embedded much into the secondary particles as the first compounds 2, and it becomes difficult to exert the effect brought by maintaining the state of the nanoparticles as the noble metal particles, which is desired in the present invention. Accordingly, it is preferable that D2/D1 as the ratio of D2 with respect to D1 be set within the range of: $1 \leq D2/D1 \leq 50$. Note that D1 can be investigated by XRD diffraction (XRD) for the exhaust gas purifying catalyst powder, and with regard to D2, an average particle size can be investigated by a spectrometry method.

Figure 3:
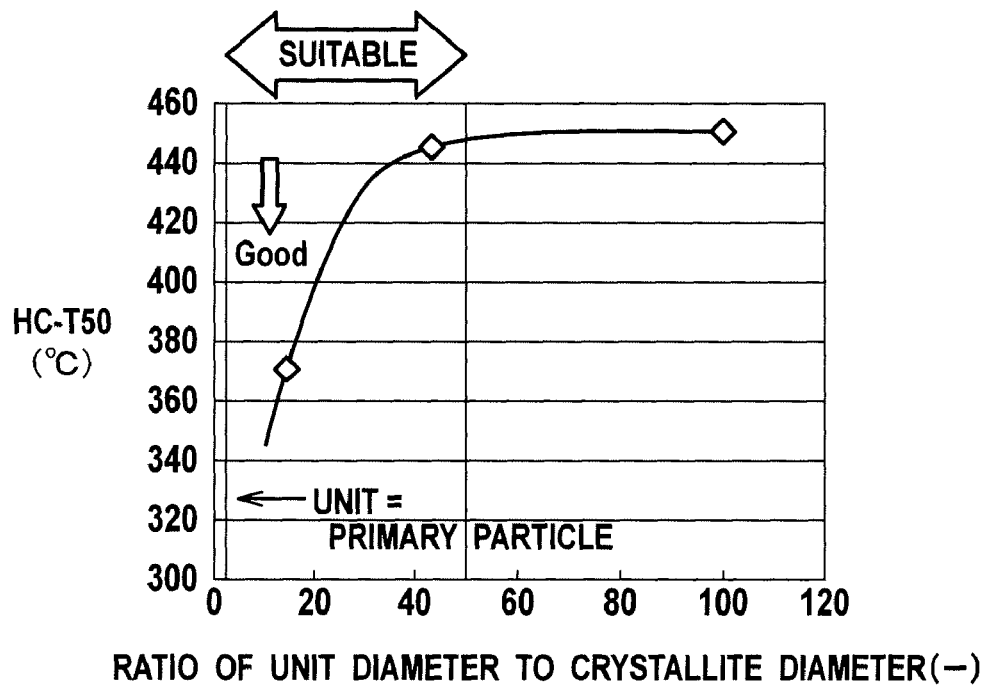
FIG. 3 is a graph showing a relationship between D2/D1 and a temperature at which an HC conversion rate reaches 50%.

FIG. 3 is a graph showing a relationship between D2/D1 as the ratio of D2 with respect to D1 and a temperature at which an HC conversion rate of the exhaust gas purifying catalyst reaches 50%. As understood from FIG. 3, when D2/D1 as the ratio of D2 with respect to D1 is within the range of: $1 \leq D2/D1 \leq 50$, good exhaust gas purifying characteristics are obtained.

Figure 4:
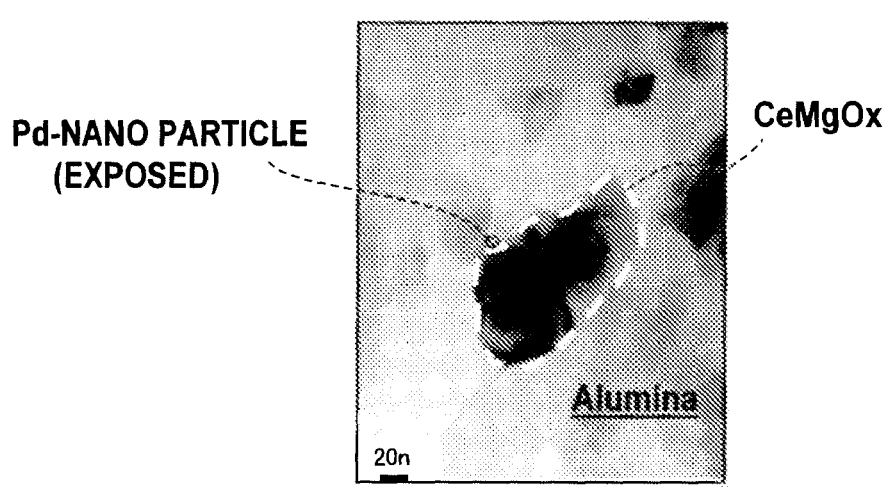
FIG. 4 is a microscope picture of a structure, showing catalyst powder of the present invention.

FIG. 4 is a microscope picture after performing the exhaust durability testing at 900° C. for the exhaust gas purifying catalyst in which D2/D1 is within the range of: $1 \leq D2/D1 \leq 50$. As understood from FIG. 4, when D2/D1 is within the range of: $1 \leq D2/D1 \leq 50$, the noble metal particles as the nanoparticles are supported on the surfaces of the first compounds, and are not embedded in the first compounds. A more preferable range of D2/D1 as the ratio of D2 with respect to D1 is $1 \leq D2/D1 \leq 20$. When D2/D1 is within the range of $1 \leq D2/D1 \leq 20$, the above-described effect can be further exerted. Details of the reason for the above are not necessarily obvious; however, the reason is considered to be because, within the range of: $1 \leq D2/D1 \leq 20$, a decrease of such an exposed area of the noble metal particles 1, which is brought by being entangled into the secondary particles as the first compounds 2 in units partitioned by the second compounds 3, is less likely to occur, and a performance obtained by maintaining the state of the nanoparticles as the noble metal particles 1 can be further obtained. Also in the graph shown in FIG. 3, the exhaust gas purifying characteristics are particularly excellent within the range of: $1 \leq D2/D1 \leq 20$.

In the exhaust gas purifying catalyst according to the present invention, it is preferable that a powder pore volume obtained by $N_2$ adsorption analysis for the powder of the exhaust gas purifying catalyst concerned be 0.3 [ml/g] to 0.5 [ml/g] per 1 g of the powder, and that an average pore diameter be 30 [nm] or less. The powder of the exhaust gas purifying catalyst according to the present invention has a pore structure that satisfies the above-described conditions, thus making it possible to allow the toxic exhaust gas to reach the catalyst active site (noble metal particles) kept as the microparticles in the first compound particles. Consequently, it becomes possible to fully extract the catalytic performance. When the powder pore volume does not reach 0.3 [ml/g] per 1 g of the powder, gas diffusibility is decreased, and such a nanoparticles active site becomes less likely to be utilized effectively. Consequently, the decrease of the exhaust gas purifying performance becomes prone to occur. Meanwhile, when the powder pore volume exceeds 0.5 [ml/g], though the gas diffusibility is sufficient, a catalyst-coated layer becomes likely to be fragile, and a problem of peeling of the coated layer or the like comes to occur. Moreover, when the average pore diameter exceeds 30 [nm], the movement/coagulation of the first compound particles which support the noble metal become prone to occur, and consequently, the noble metal particles are embedded in the first compound particles, and the catalytic performance is decreased.

In the exhaust gas purifying catalyst of the present invention, it is preferable that the noble metal particles be contained totally by $8 \times 10^{-20}$ moles or less in the sections partitioned by the second compounds 3. As shown in FIG. 1, the noble metal particles 1 are encapsulated in the second compounds 3 together with the first compounds. The plurality of noble metal particles 1 contained in the sections partitioned by the second compounds 3 sometimes move owing to the high temperature. However, the noble metal particles 1 do not move to the second compounds 3 owing to the effect of the first compounds 2 as the anchor members, move only in the sections (in the units) partitioned by the second compounds 3, and are coagulated into one or a plurality of the noble metal particles.

Figure 5:
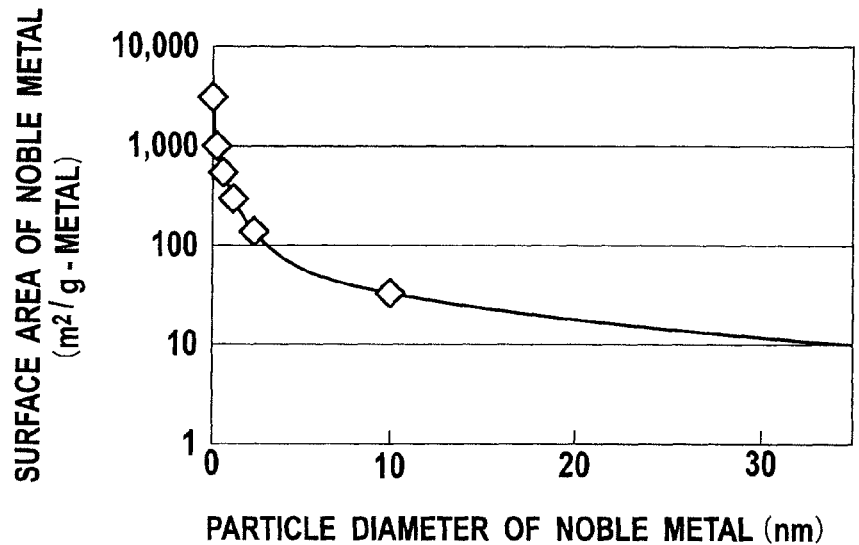
FIG. 5 is a graph showing a noble metal particle diameter and a noble metal surface area.

Here, in the case where the noble metal particles are coagulated in one unit, when a particle diameter of the coagulated noble metal particle is 10 [nm] or less, the noble metal particle exhibits sufficient catalytic activity, and a deterioration of the catalytic activity, which may be caused by the coagulation can be suppressed. FIG. 5 is a graph showing the diameter of the noble metal particle and a surface area of the noble metal with regard to platinum and palladium, which serve as the noble metals having the catalytic activity. Note that, in FIG. 5, substantially the same curve is drawn both in the case where the noble metal is platinum and in the case where the noble metal is palladium, and accordingly, the relationship is drawn as one curve. As obvious from FIG. 5, when the particle diameter of the noble metal is 10 [nm] or less, the surface area of the particle is large, and sufficient activity is obtained. Accordingly, the deterioration of the catalytic activity, which may be caused by the coagulation, can be suppressed.

Figure 6:
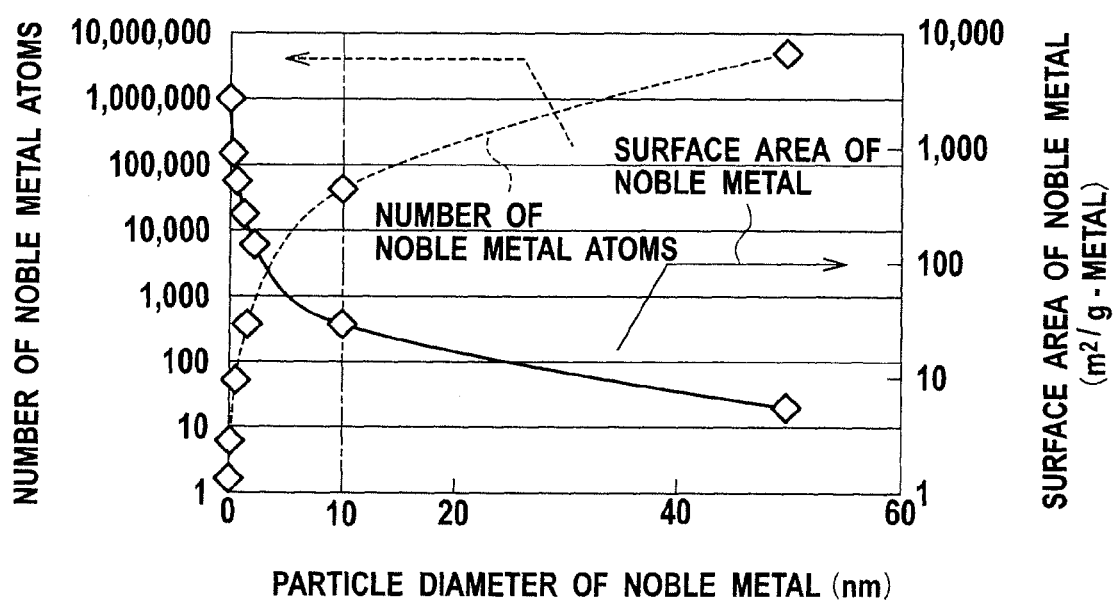
FIG. 6 is a graph showing a relationship between the noble metal particle diameter and the number of atoms of noble metal.

FIG. 6 is a graph showing a relationship between the particle diameter of the noble metal and the number of atoms of the noble metal with regard to platinum and palladium, which serve as the noble metals having the catalytic activity. Note that, in FIG. 6, substantially the same curve is drawn both in the case where the noble metal is platinum and in the case where the noble metal is palladium, and accordingly, the relationship is drawn as one curve. As obvious from FIG. 6, the number of atoms when the particle diameter of the noble metal is 10 [nm] is approximately 48000. When this value is converted into the number of moles, the number of moles becomes approximately $8 \times 10^{-20}$ moles or less.

From these viewpoints, the amount of noble metals in the units is restricted to be $8 \times 10^{-20}$ moles or less, thus making it possible to suppress the deterioration of the catalytic activity even if the noble metals are coagulated into one in each of the units.

As means for reducing the amount of noble metals contained in the unit to $8 \times 10^{-20}$ moles or less, two means exist, which are for reducing a support concentration of the noble metal particles 1 on the first compounds 2, and which are for reducing the particle diameter of the first compounds 2 which support the noble metal particles 1. In the present invention, the means is not limited to these. However, in the case of considering actual manufacture of the catalyst, in such a former method of reducing the support concentration, a volume of a honeycomb carrier on which the exhaust gas purifying catalyst is coated must be increased in order to maintain predetermined performance of the exhaust gas purifying catalyst. Hence, it is necessary to coat the catalyst on the honeycomb carrier by such a coating amount larger by one digit than usual, and accordingly, the former method is not realistic.

Figure 7:
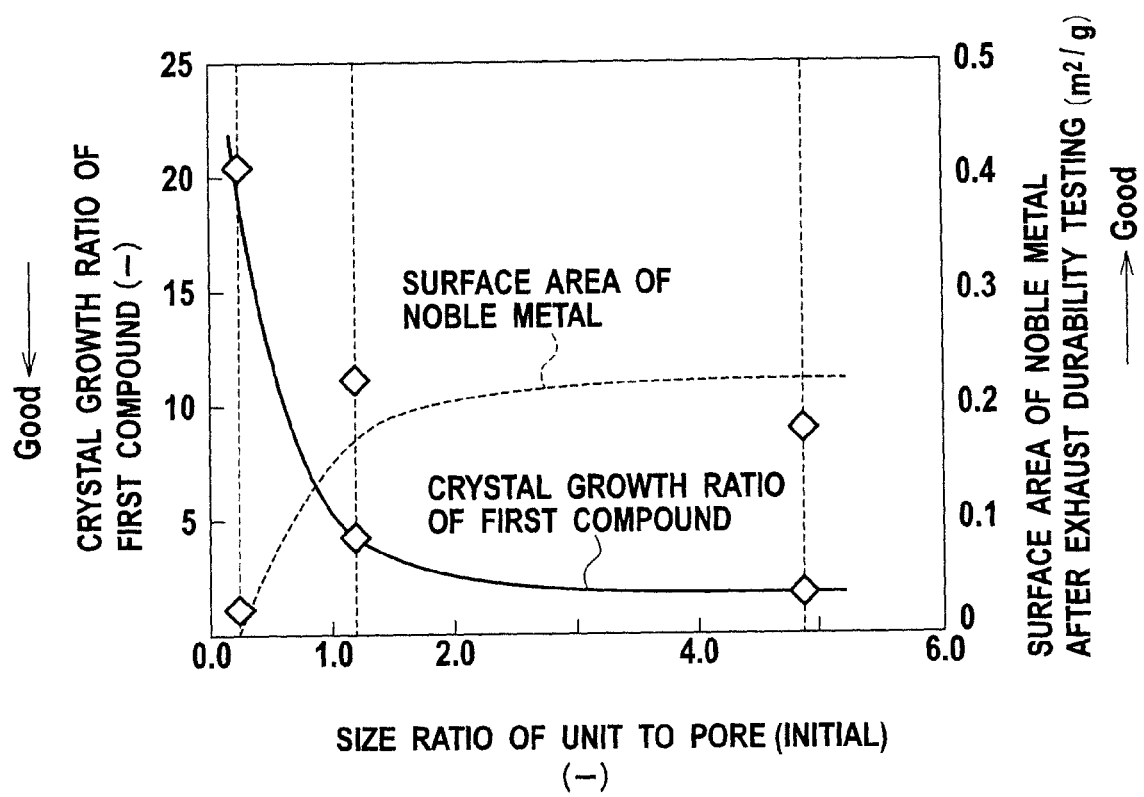
FIG. 7 is a graph showing a relationship between D2/D3 and a surface area of the noble metal particles.

Next, with regard to composite particles composed of the noble metal particles 1 and the first compounds 2 which support the noble metal particles 1, in a size (average particle diameter of the composite particles) D2 of the composite particles and an average pore diameter D3 of pores formed in the second compounds 3 which encapsulate the composite particles, it is preferable that D2/D3 as a ratio of D2 with respect to D3 be 1 or more. The fact that D2/D3 is 1 or more stands for that the average particle diameter D2 of the units of the composite particles composed of the noble metal particles 1 and the first compounds 2 is larger than the average particle diameter D3 of gaps formed in the second compounds 3. By the fact that D2/D3 is 1 or more, the composite particles composed of the noble metal particles 1 and the first compounds 2 are suppressed from moving through the pores formed in the second compounds 3. Hence, a decrease of an encapsulation effect by the second compounds 3 is suppressed. This effect is verified by an experiment of the inventors of the present invention. FIG. 7 is a graph showing relationships among D2/D3 as the ratio of the size D2 of the composite particles with respect to the average pore diameter D3, which is taken on an axis of abscissas, and a crystal growth rate of $CeO_2$ as the first compounds and a surface area of Pt as the noble metal particles after the exhaust durability testing, which are taken on axes of ordinates. From FIG. 7, it is understood that, when D2/D3 is 1 or more, the crystal growth rate of $CeO_2$ is significantly decreased, that is, the sintering of $CeO_2$ is a little, and accordingly, the encapsulation effect is large, and moreover, the surface area of Pt after the durability testing is large, that is, the coagulation of Pt is a little, and accordingly, the decrease of the catalytic activity is a little.

Next, in the event of manufacturing the exhaust gas purifying catalyst of the present invention, a method can be used, which includes the steps of: sintering first compounds in advance, and then supporting noble metal particles on the first compounds; milling the first compounds on which the noble metal particles are supported; and forming second compounds on the peripheries of the milled first compounds on which the noble metal particles are supported.

As described above, the first compounds are composed of the composite containing the rare earth element and at least one of the alkali metal and the alkali earth metal. The first compounds as described above are sintered in advance, whereby the complexing of the rare earth element and the alkali metal or the alkali earth metal can be promoted, and the sintering caused therebetween can be suppressed. After the first compounds are sintered, the noble metal particles are supported thereon, thus making it possible for the noble metal particles to maintain the state of the nanoparticles without being embedded in the first compounds. The first compounds on which the noble metal particles are supported are milled, thus making it possible to adjust the amount of noble metal in the sections (units) encapsulated by the second compounds within a predetermined range in the subsequent step. The second compounds are formed on the milled first compounds on which the noble metal particles are supported, whereby the first compounds on which the noble metal particles are supported are encapsulated by the second compounds, and are contained in the sections partitioned by the second compounds. Conditions when these steps are performed can be set appropriately. Moreover, steps other than these steps conform to the conventional method, and the exhaust gas purifying catalyst of the present invention can be manufactured.

The powder of the exhaust gas purifying catalyst, which is obtained as described above, is made into slurry, and this slurry is coated on inner wall surfaces of the catalyst honeycomb base member as a fire-resistant inorganic carrier. In such a way, the powder of the exhaust gas purifying catalyst serves for purifying the exhaust gas.

EXAMPLES

A description will be specifically made below of the present invention based on examples.

[Manufacture of Catalyst]

Exhaust gas purifying catalysts of Examples 1 to 27 and Comparative examples 1 to 5, which are shown in Table 1 and Table 2, were manufactured in the following manner. Table 1 shows noble metal particles and first compounds in the exhaust gas purifying catalysts of Examples 1 to 27 and Comparative examples 1 to 5. Table 2 shows second compounds, catalyst powder characteristics and catalytic performances in the exhaust gas purifying catalysts of Examples 1 to 27 and Comparative examples 1 to 5.

TABLE 1

| Example/Comparative example | Noble metal particle Species | Support concentration to first compound (wt %) | Rare earth element (%) | Alkali/alkali earth elements | Loading of alkali/alkali earth elements | Addition of Zr | First compound Compound species | Average secondary particle diameter; D2 (nm) | Sintering temperate (° C. * Hr) | Crystallite diameter D1 (nm) | Amount of noble metal in unit (mol/unit) |
|---|---|---|---|---|---|---|---|---|---|---|---|
| Example 1 | Pd | 0.5 | Ce | Rb | 5 mol % | None | CeRbOx | 310 | 600 * 3 | 9 | 5.4E−20 |
| Example 2 | Pd | 0.5 | Ce | Ba | 5 mol % | None | CeBaOx | 310 | 600 * 3 | 9 | 5.4E−20 |
| Example 3 | Pd | 0.5 | Ce | Cs | 5 mol % | None | CeCsOx | 310 | 600 * 3 | 9 | 5.4E−20 |
| Example 4 | Pd | 0.5 | Ce | Mg | 5 mol % | None | CeMgOx | 330 | 600 * 3 | 9 | 6.5E−20 |
| Example 5 | Pd | 0.5 | Nd | Mg | 5 mol % | None | NdMgOx | 290 | 600 * 3 | 10 | 4.4E−20 |
| Example 6 | Pd | 0.5 | Pr | Ca | 5 mol % | None | PrCaOx | 310 | 600 * 3 | 8 | 5.4E−20 |
| Example 7 | Pd | 0.5 | La(5), Ce(95) | Mg | 5 mol % | None | $La_{0.05}Ce_{0.95}MgOx$ | 310 | 600 * 3 | 7 | 5.4E−20 |
| Example 8 | Pd | 0.5 | Ce | Mg | 5 mol % | None | CeMgOx | 330 | 800 * 3 | 15 | 6.5E−20 |
| Example 9 | Pd | 0.5 | Ce | Mg | 5 mol % | None | CeMgOx | 340 | 1000 * 3 | 22 | 7.1E−20 |
| Example 10 | Pd | 0.5 | Ce | Mg | 5 mol % | None | CeMgOx | 350 | 1100 * 3 | 35 | 7.7E−20 |
| Example 11 | Pd | 0.5 | Ce | Mg | 5 mol % | 10 mol % | CeZrMgOx | 330 | 1000 * 3 | 26 | 6.5E−20 |
| Example 12 | Pt | 0.5 | Ce | Mg | 5 mol % | 10 mol % | CeZrMgOx | 330 | 1000 * 3 | 26 | 3.5E−20 |
| Example 13 | Rh | 0.5 | Ce | Mg | 5 mol % | None | CeMgOx | 180 | 1000 * 3 | 9 | 6.7E−20 |
| Example 14 | Pd | 1.0 | Ce | Mg | 5 mol % | 10 mol % | CeZrMgOx | 155 | 1000 * 3 | 26 | 1.3E−20 |

TABLE 1-continued

| Example/Comparative example | Noble metal particle Species | Support concentration to first compound (wt %) | Rare earth element (%) | Alkali/alkali earth elements | Loading of alkali/alkali earth elements | Addition of Zr | First compound Compound species | Average secondary particle diameter; D2 (nm) | Sintering temperate (° C. * Hr) | Crystallite diameter D1 (nm) | Amount of noble metal in unit (mol/unit) |
|---|---|---|---|---|---|---|---|---|---|---|---|
| Example 15 | Pd | 0.5 | Ce | Na | 5 mol % | None | $CeNaOx$ | 310 | 600 * 3 | 8 | 5.4E−20 |
| Example 16 | Pd | 0.5 | Ce | K | 5 mol % | None | $CeKOx$ | 310 | 600 * 3 | 7 | 5.4E−20 |
| Example 17 | Pd | 0.5 | Ce | Sr | 5 mol % | None | $CeSrOx$ | 310 | 600 * 3 | 8 | 5.4E−20 |
| Example 18 | Pd | 0.5 | Ce | Mg | 5 mol % | None | $CeMgOx$ | 330 | 600 * 3 | 6 | 6.5E−20 |
| Example 19 | Pd | 0.5 | Ce | None | — | Zr | $Ce_{15}Zr_{85}Ox$ | 310 | 900 * 3 | 18 | 3.5E−20 |
| Example 20 | Pd | 0.5 | La, Ce | None | — | Zr | $Ce_{14}Zr_{85}La_1Ox$ | 310 | 900 * 3 | 18 | 3.5E−20 |
| Example 21 | Pd | 0.5 | Nd, Ce | None | — | Zr | $Ce_{14}Zr_85Nd_1Ox$ | 310 | 900 * 3 | 18 | 3.5E−20 |
| Example 22 | Pd | 0.5 | La, Ce | None | — | Zr | $Ce_{14}Zr_{85}La_1Ox$ | 310 | 900 * 3 | 18 | 3.5E−20 |
| Example 23 | Pd | 0.5 | Pr, Ce | None | — | Zr | $Ce_{14}Zr_{85}Pr_1Ox$ | 310 | 900 * 3 | 17 | 3.5E−20 |
| Example 24 | Rh | 0.5 | Pr, Ce | None | — | Zr | $Ce_{14}Zr_{85}Pr_1Ox$ | 310 | 900 * 3 | 16 | 3.5E−20 |
| Example 25 | Pd | 0.5 | Ce | Mg | 5 mol % | None | $CeMgOx$ | 330 | 900 * 3 | 9 | 6.5E−20 |
| Example 26 | Pd | 0.5 | Ce, Y | None | — | Zr | $Ce_{10}Zr_{80}Y_{10}Ox$ | 310 | 900 * 3 | 18 | 3.5E−20 |
| Example 27 | Rh | 0.5 | Ce, Y | None | — | Zr | $Ce_{10}Zr_{80}Y_{10}Ox$ | 310 | 900 * 3 | 18 | 3.5E−20 |
| Comparative example 1 | Pd | 0.5 | Ce | — | — | — | $CeO_2$ | 310 | 400 * 3 | 8 | 5.4E−20 |
| Comparative example 2 | Pd | 1.0 | Ce | — | — | 10 mol % | $CeZrOx$ | 155 | 400 * 3 | 7 | 1.3E−20 |
| Comparative example 3 | Pd | 0.5 | Ce(10)Zr(3)/γ-alumina | — | — | — | — | — | — | — | — |
| Comparative example 4 | Pt | 0.5 | Ce(10)Zr(3)/γ-alumina | — | — | — | — | — | — | — | — |
| Comparative example 5 | Rh | 0.5 | Zr(3)/γ-γ-alumina | — | — | — | — | — | — | — | — |

TABLE 2

| Example/Comparative example | Second compound Species | Second compound Average pore diameter; D3 (nm) | Second compound Pore volume (ml/g) | D2/D1 (—) | D2/D3 (—) | Maintenance of particle Noble metal particle diameter after durability testing at 900° C. for 30 hours (nm) | Catalytic performance in low-temperature activation HC T50 after durability testing at 900° C. for 30 hours (° C.) |
|---|---|---|---|---|---|---|---|
| Example 1 | γ-alumina | 22 | 0.49 | 34.4 | 14 | 9 | 429 |
| Example 2 | γ-alumina | 22 | 0.48 | 34.4 | 14 | 8 | 433 |
| Example 3 | γ-alumina | 22 | 0.49 | 34.4 | 14 | 6 | 436 |
| Example 4 | γ-alumina | 22 | 0.40 | 36.7 | 15 | 8 | 448 |
| Example 5 | γ-alumina | 22 | 0.38 | 29.0 | 13 | 10 | 441 |
| Example 6 | γ-alumina | 22 | 0.35 | 38.8 | 14 | 7 | 438 |
| Example 7 | γ-alumina | 22 | 0.41 | 44.3 | 14 | 13 | 446 |
| Example 8 | γ-alumina | 22 | 0.36 | 22.0 | 15 | 6 | 437 |
| Example 9 | γ-alumina | 22 | 0.31 | 15.5 | 15 | 5 | 373 |
| Example 10 | γ-alumina | 22 | 0.3 | 10.0 | 16 | 9 | 316 |
| Example 11 | γ-alumina | 22 | 0.43 | 12.7 | 15 | 6 | 361 |
| Example 12 | γ-alumina | 22 | 0.39 | 12.7 | 15 | 8 | 368 |
| Example 13 | γ-alumina | 22 | 0.35 | 20.0 | 8 | 6 | 287 |
| Example 14 | γ-alumina | 22 | 0.36 | 6.0 | 7 | 5 | 309 |
| Example 15 | γ-alumina | 22 | 0.40 | 38.8 | 14 | 9 | 440 |
| Example 16 | γ-alumina | 22 | 0.39 | 44.3 | 14 | 9 | 436 |
| Example 17 | γ-alumina | 22 | 0.39 | 38.8 | 14 | 9 | 447 |
| Example 18 | γ-alumina | 22 | 0.36 | 55.0 | 15 | 8 | 455 |
| Example 19 | γ-alumina | 31 | 0.48 | 17.2 | 10 | 10 | 382 |
| Example 20 | Ce-added γ-alumina | 28 | 0.42 | 17.2 | 11 | 12 | 367 |
| Example 21 | $Ce_3Zr_2La_1$-added γ-alumina | 25 | 0.44 | 17.2 | 12 | 7 | 353 |
| Example 22 | $Ce_3Zr_2La_1Ba_1$-added γ-alumina | 25 | 0.36 | 17.2 | 12 | 7 | 343 |
| Example 23 | $Ce_3Zr_2La_1Ba_1$-added γ-alumina | 25 | 0.5 | 18.2 | 12 | 7 | 360 |
| Example 24 | $Ce_3Zr_2$-added γ-alumina | 25 | 0.37 | 19.4 | 12 | 7 | 293 |
| Example 25 | $Ce_3Zr_2La_1$-added γ-alumina | 24 | 0.43 | 36.7 | 14 | 7 | 402 |
| Example 26 | γ-alumina | 25 | 0.38 | 17.2 | 12 | 8 | 332 |
| Example 27 | $Ce_3Zr_2$-added γ-alumina | 25 | 0.37 | 17.2 | 12 | 6 | 286 |
| Comparative example 1 | γ-alumina | 22 | 0.45 | 38.8 | 14 | 106 | 483 |
| Comparative example 2 | γ-alumina | 22 | 0.18 | 22.1 | 7 | 103 | 460 |
| Comparative example 3 | — | — | 0.10 | — | — | 130 | 479 |
| Comparative example 4 | — | — | 0.10 | — | — | 101 | 490 |
| Comparative example 5 | — | — | 0.17 | — | — | 45 | 432 |

Example 1

Powder Preparation Step

Into nanoparticle powder of Ce oxide, Rb acetate was impregnated and supported so that a concentration of Rb acetate became 5 mol % to the Ce oxide, followed by drying. Moreover, a resultant of the above was fired at 600° C. for three hours in an air atmosphere, and the first compounds of Example 1 were obtained. A crystallite diameter obtained by performing measurement for the formed powder of the first compounds by the XRD and by performing calculation using the Scherrer's equation was as shown in Table 1.

On the powder obtained in the above-described step, a tetraamine Pd solution was supported so that the noble metal support concentration became 0.5 wt % to the powder, and was dried, followed by firing at 400° C. for an hour in the air.

The powder of Pd (0.5 wt %)/$CeRbO_x$, which was thus obtained, was milled in an aqueous solution, and dispersed slurry thereof with an average particle diameter of 310 nm was obtained.

Meanwhile, into dispersed slurry in which boehmite powder was dispersed, the dispersed slurry of such noble metal-supported first compounds obtained in the above-described step was put, and was dried, followed by firing at 550° C. for three hours in the air. In such a way, catalyst powder of Example 1 was obtained.

Note that, in the boehmite (precursor of second compounds) used at this time, an average gap diameter thereof calculated by the $N_2$ adsorption method in the case of drying/firing only the boehmite under the same conditions was 22 nm. Hence, it can be considered that a pore diameter of the second compounds of the above-described noble metal-containing powder also conforms to the above-described value.

<Coating Step on Honeycomb Base Member>

A predetermined amount of the above-described powder and a predetermined amount of the boehmite were put into a magnetic pot, and were milled until an average particle diameter of a mixture thereof could reach 3 μm. Thereafter, a slurry of the milled mixture was coated on a cordierite-made honeycomb base member with a volume of 0.119 L (400 cpsi, 6 mil), and excessive slurry was removed therefrom in an airflow, followed by drying at 130° C. and firing at 400° C. for an hour in the air atmosphere. In such a way, a catalyst honeycomb base member of Example 1 was obtained. An amount of the noble metal per 1 L of the catalyst honeycomb at this time was 0.5 g/L—honeycomb.

Example 2

A catalyst honeycomb of Example 2 was obtained in a similar way to Example 1 except that the Rb acetate in the above-described powder preparation step was changed to Ba acetate.

Example 3

A catalyst honeycomb of Example 3 was obtained in a similar way to Example 1 except that the Rb acetate in the above-described powder preparation step was changed to Cs acetate.

Example 4

A catalyst honeycomb of Example 4 was obtained in a similar way to Example 1 except that the Rb acetate in the above-described powder preparation step was changed to Mg acetate, and that an average particle diameter of dispersed slurry of Pd-supported $CeMgO_x$ powder in the same step was set at 330 nm.

Example 5

A catalyst honeycomb of Example 5 was obtained in a similar way to Example 1 except that the nanoparticle powder of the Ce oxide in the above-described powder preparation step was changed to $Nd_2O_3$, that the Rb acetate in the same step was changed to the Mg acetate, and that an average particle diameter of dispersed slurry of Pd-supported $NdMgO_x$ powder in the same step was set at 290 nm.

Example 6

A catalyst honeycomb of Example 6 was obtained in a similar way to Example 1 except that the nanoparticle powder of the Ce oxide in the above-described powder preparation step was changed to $Pr_2O_3$, that the Rb acetate in the same step was changed to Ca acetate, and that an average particle diameter of dispersed slurry of Pd-supported $PrCaO_x$ powder in the same step was set at 310 nm.

Example 7

La nitrate was impregnated into and supported on the nanoparticle powder of the Ce oxide in the above-described powder preparation step in Example 1 was impregnated so as to obtain $CeO_2$ on which 5 mol % of La was supported. Then, a mixture thus obtained was dried, and was fired at 400° C. for an hour in an airflow. Subsequently, a predetermined amount of Mg acetate was impregnated into and supported on the mixture, and was then dried and fired, the noble metal was supported thereon, and a firing process similar way to Example 1 was performed therefor. Next, in the step of micrograining powder, which was thus obtained, by milling, an average particle diameter was set at 310 nm. In a similar way to Example 1 except for the above, a catalyst honeycomb of Example 7 was obtained.

Example 8

A catalyst honeycomb of Example 8 was obtained in a similar way to Example 4 except that, in the above-described powder preparation step, the step of firing the raw material of the first compounds at 600° C. for three hours was performed at 800° C. for three hours.

Example 9

A catalyst honeycomb of Example 9 was obtained in a similar way to Example 4 except that, in the above-described powder preparation step, the step of firing the raw material of the first compounds at 600° C. for three hours was performed at 1000° C. for three hours, and that, in the step of milling the slurry, the average particle diameter thereof was set at 340 nm.

Example 10

A catalyst honeycomb of Example 10 was obtained in a similar way to Example 4 except that, in the above-described powder preparation step, the step of firing the raw material of the first compounds at 600° C. for three hours was performed at 1100° C. for three hours, and that, in the step of milling the slurry, the average particle diameter thereof was set at 350 nm.

Example 11

A catalyst honeycomb of Example 11 was obtained in a similar way to Example 9 except that, in the powder manufacturing step, the nanoparticle powder of the Ce oxide was changed to $CeO_2$ containing 10 mol % of Zr, and that, in the step of milling the slurry, the average particle diameter thereof was set at 330 nm.

Example 12

A catalyst honeycomb of Example 12 was obtained in a similar way to Example 11 except that the tetraamine Pd was changed to tetraamine Pt.

Example 13

A catalyst honeycomb of Example 13 was obtained in a similar way to Example 9 except that, in the above-described powder preparation step, the tetraamine Pd was changed to Rh nitrate, and that the average particle diameter of the milled slurry was set at 180 nm.

Example 14

A catalyst honeycomb of Example 14 was obtained in a similar way to Example 11 except that the support concentration of Pd to $CeZrMgO_x$ was set at 1.0%, that the average particle diameter of the slurry was set at 155 nm, that γ-alumina was mixed thereinto so that the amount of noble metal per 1 L of the honeycomb became equivalent to Example 11 at the time of coating the slurry on the catalyst honeycomb.

Example 15

A catalyst honeycomb of Example 15 was obtained in a similar way to Example 4 except that $CeMgO_x$ was changed to $CeNaO_x$.

Example 16

A catalyst honeycomb of Example 16 was obtained in a similar way to Example 4 except that $CeMgO_x$ was changed to $CeKO_x$.

Example 17

A catalyst honeycomb of Example 17 was obtained in a similar way to Example 4 except that CeMgO$_x$ was changed to CeSrO$_x$.

Example 18

Powder Preparation Step

Into nanoparticle powder of Ce oxide, Mg acetate was impregnated and supported so that a concentration of Mg acetate became 5 mol % to the Ce oxide, followed by drying. Moreover, a resultant of the above was fired at 400° C. for three hours in an air atmosphere, and the first compounds of Example 18 were obtained. A crystallite diameter obtained by performing measurement for the formed powder of the first compounds by the XRD and by performing calculation using the Scherrer's equation was as shown in Table 1.

On the powder obtained in the above-described step, a tetraamine Pd solution was supported so that the noble metal support concentration became 0.5 wt % to the powder, and was dried, followed by firing at 400° C. for an hour in the air.

The powder of Pd (0.5 wt %)/CeMgO$_x$, which was thus obtained, was milled in an aqueous solution, and dispersed slurry thereof with an average particle diameter of 330 nm was obtained.

Meanwhile, into dispersed slurry in which boehmite powder was dispersed, the dispersed slurry of such noble metal-supported first compounds obtained in the above-described step was put, and was dried, followed by firing at 550° C. for three hours in the air. In such a way, catalyst powder of Example 18 was obtained.

Note that, in the boehmite (precursor of second compounds) used at this time, an average gap diameter thereof calculated by the N$_2$ adsorption method in the case of drying/firing only the boehmite under the same conditions was 22 nm. Hence, it can be considered that a pore diameter of the second compounds of the above-described noble metal-containing powder also conforms to the above-described value.

<Coating Step on Honeycomb Base Member>

A predetermined amount of the above-described powder and a predetermined amount of the boehmite were put into a magnetic pot, and were milled until an average particle diameter of a mixture thereof could reach 3 μm. Thereafter, a slurry of the milled mixture was coated on a cordierite-made honeycomb base member with a volume of 0.119 L (400 cpsi, 6 mil), and excessive slurry was removed therefrom in an airflow, followed by drying at 130° C. and firing at 400° C. for an hour in the air atmosphere. In such a way, a catalyst honeycomb base member of Example 18 was obtained. An amount of the noble metal per 1 L of the catalyst honeycomb at this time was 0.5 g/L—honeycomb.

Example 19

Powder Preparation Step

Into nanoparticle powder of Zr oxide, Ce acetate was impregnated and supported so that a concentration of Ce acetate became 15 mol % to the Zr oxide, followed by drying. Moreover, a resultant of the above was fired at 900° C. for three hours in an air atmosphere, and the first compounds of Example 19 were obtained. A crystallite diameter obtained by performing measurement for the formed powder of the first compounds by the XRD and by performing calculation using the Scherrer's equation was as shown in Table 1.

On the powder obtained in the above-described step, a dinitrodiamine Pd solution was supported so that the noble metal support concentration became 0.5 wt % to the powder, and was dried, followed by firing at 400° C. for an hour in the air.

The powder of Pd (0.5 wt %)/ZrCeO$_x$, which was thus obtained, was milled in an aqueous solution, and dispersed slurry thereof with an average particle diameter of 310 nm was obtained.

Meanwhile, into dispersed slurry in which boehmite powder was dispersed, the dispersed slurry of such noble metal-supported first compounds obtained in the above-described step was put, and was dried, followed by firing at 550° C. for three hours in the air. In such a way, catalyst powder of Example 19 was obtained.

Note that, in the boehmite (precursor of second compounds) used at this time, an average gap diameter thereof calculated by the N$_2$ adsorption method in the case of drying/firing only the boehmite under the same conditions was 31 nm. Hence, it can be considered that a pore diameter of the second compounds of the above-described noble metal-containing powder also conforms to the above-described value.

Moreover, a pore volume of Example 19, which was obtained at this time, was a value shown in Table 2.

<Coating Step on Honeycomb Base Member>

A predetermined amount of the above-described powder and a predetermined amount of the boehmite were put into a magnetic pot, and were milled until an average particle diameter of a mixture thereof could reach 3 μm. Thereafter, a slurry of the milled mixture was coated on a cordierite-made honeycomb base member with a volume of 0.119 L (400 cpsi, 6 mil), and excessive slurry was removed therefrom in an airflow, followed by drying at 130° C. and firing at 400° C. for an hour in the air atmosphere. In such a way, a catalyst honeycomb of Example 19 was obtained. An amount of the noble metal per 1 L of the catalyst honeycomb at this time was 0.5 g/L—honeycomb.

Example 20

A catalyst honeycomb of Example 20 was obtained in a similar way to Example 19 except that predetermined amounts of Ce nitrate and La nitrate were added to the Zr oxide so as to achieve a molar composition shown in Table 1 instead of adding Ce thereto, that Ce nitrate was put into the slurry in which the boehmite powder was dispersed, and that an average gap diameter of the boehmite for use was 28 nm.

Example 21

A catalyst honeycomb of Example 21 was obtained in a similar way to Example 19 except that predetermined amounts of Ce nitrate and Nd nitrate were added to the Zr oxide so as to achieve a molar composition shown in Table 1 instead of adding Ce thereto, that Ce nitrate, Zr nitrate and La nitrate were put into the slurry in which the boehmite powder was dispersed, and that an average gap diameter of the boehmite for use was 25 nm.

Example 22

A catalyst honeycomb of Example 22 was obtained in a similar way to Example 19 except that predetermined amounts of Ce nitrate and La nitrate were added to the Zr oxide so as to achieve a molar composition shown in Table 1 instead of adding Ce thereto, that Ce nitrate, Zr nitrate, La nitrate and Ba nitrate were put into the slurry in which the boehmite powder was dispersed, and that an average gap diameter of the boehmite for use was 25 nm.

Example 23

A catalyst honeycomb of Example 23 was obtained in a similar way to Example 19 except that predetermined amounts of Ce nitrate and Pr nitrate were added to the Zr oxide so as to achieve a molar composition shown in Table 1 instead of adding Ce thereto, that Ce nitrate, Zr nitrate, La nitrate and Ba nitrate were put into the slurry in which the boehmite powder was dispersed, and that an average gap diameter of the boehmite for use was 25 nm.

Example 24

A catalyst honeycomb of Example 24 was obtained in a similar way to Example 19 except that predetermined amounts of Ce nitrate and Pr nitrate were added to the Zr oxide so as to achieve a molar composition shown in Table 1 instead of adding Ce thereto, that Ce nitrate and Zr nitrate were put into the slurry in which the boehmite powder was dispersed, that an average gap diameter of the boehmite for use was 25 nm, and the dinitrodiamine Pd was changed to Rh nitrate.

Example 25

A catalyst honeycomb of Example 25 was obtained in a similar way to Example 4 except that predetermined amounts of Ce nitrate, Zr nitrate and La nitrate were put into the slurry in which the boehmite powder was dispersed so as to achieve a composition shown in Table 1, and that an average gap diameter of the boehmite for use was 24 nm.

Example 26

A catalyst honeycomb of Example 26 was obtained in a similar way to Example 19 except that predetermined amounts of Ce nitrate and Y nitrate were added to the Zr oxide so as to achieve a molar composition shown in Table 1 instead of adding Ce thereto.

Example 27

A catalyst honeycomb of Example 27 was obtained in a similar way to Example 24 except that predetermined amounts of Ce nitrate and Y nitrate were added to the Zr oxide so as to achieve a molar composition shown in Table 1 instead of adding Ce and Pr thereto.

Comparative Example 1

Unlike Examples 1 to 25, Comparative example 1 is an example where the first compounds in the catalyst powder contain only a rare earth element (Ce) as a main component.

<Powder Preparation Step>

Into nanoparticle powder of Ce oxide, a dinitrodiamine Pd solution was supported so that a support concentration of the noble metal became 0.5 wt % to the powder, and was dried, followed by firing at 400° C. for an hour in the air.

The powder of Pd (0.5 wt %)/$CeO_2$, which was thus obtained, was milled in an aqueous solution, and dispersed slurry thereof with an average particle diameter of 310 nm was obtained.

Meanwhile, into dispersed slurry in which boehmite powder was dispersed, the powder-dispersed slurry obtained in the above-described step was put, and was dried, followed by firing at 550° C. for three hours in the air. In such a way, catalyst powder of Comparative example 1 was obtained.

Note that, in the boehmite (precursor of second compounds) used at this time, an average gap diameter thereof calculated by the $N_2$ adsorption method in the case of drying/firing only the boehmite under the same conditions was 22 nm. Hence, it can be considered that a pore diameter of the second compounds of the above-described noble metal-containing powder also conforms to the above-described value.

<Coating Step on Honeycomb Base Member>

A predetermined amount of the above-described powder and a predetermined amount of the boehmite were put into a magnetic pot, and were milled until an average particle diameter of a mixture thereof could reach 3 μm. Thereafter, a slurry of the milled mixture was coated on a cordierite-made honeycomb base member with a volume of 0.119 L (400 cpsi, 6 mil), and excessive slurry was removed therefrom in an airflow, followed by drying at 130° C. and firing at 400° C. for an hour in the air atmosphere. In such a way, a catalyst honeycomb base member of Comparative example 1 was obtained. An amount of the noble metal per 1 L of the catalyst honeycomb at this time was 0.5 g/L—honeycomb.

Comparative Example 2

Unlike Examples 1 to 25, Comparative example 2 is an example where the first compounds in the catalyst powder contain only rare earth elements (Ce—Zr (Ce-enriched)) as a main component.

<Powder Preparation Step>

Into nanoparticle powder of Ce oxide containing 10 mol % of Zr, a dinitrodiamine Pd solution was supported so that a support concentration of the noble metal became 1.0 wt % to the powder, and was dried, followed by firing at 400° C. for three hours in the air. The powder of Pd (1.0 wt %)/$CeZrO_x$, which was thus obtained, was milled in an aqueous solution, and dispersed slurry thereof with an average particle diameter of 155 nm was obtained.

Meanwhile, into dispersed slurry in which boehmite powder was dispersed, the powder-dispersed slurry obtained in the above-described step was put, and was dried, followed by firing at 550° C. for three hours in the air. In such a way, catalyst powder of Comparative example 2 was obtained.

Note that, in the boehmite (precursor of second compounds) used at this time, an average gap diameter thereof calculated by the $N_2$ adsorption method in the case of drying/firing only the boehmite under the same conditions was 22 nm. Hence, it can be considered that a pore diameter of the second compounds of the above-described noble metal-containing powder also conforms to the above-described value.

<Coating Step on Honeycomb Base Member>

A predetermined amount of the above-described powder, γ-alumina and a predetermined amount of the boehmite were put into a magnetic pot, and were milled until an average particle diameter of a mixture thereof could reach 3 μm. Thereafter, a slurry of the milled mixture was coated on a cordierite-made honeycomb base member with a volume of 0.119 L (400 cpsi, 6 mil), and excessive slurry was removed therefrom in an airflow, followed by drying at 130° C. and firing at 400° C. for an hour in the air atmosphere. In such a way, a catalyst honeycomb base member of Comparative example 2 was obtained. An amount of the noble metal per 1 L of the catalyst honeycomb at this time was 0.5 g/L—honeycomb.

Comparative Example 3

Unlike Examples 1 to 25, Comparative example 3 is an example where the first compounds in the catalyst powder contain only rare earth elements (Ce—Zr/alumina) as a main component, and the second compounds are not provided.

Into γ-alumina, Ce nitrate and zirconyl nitrate were impregnated so that Ce component became 10 mol % to the γ-alumina and that Zr component became 3 mol %, and then was dried at 130° C., followed by firing at 400° C. for three hours in the air.

Subsequently, dinitrodiamine Pd was supported on the above-described powder so that a support concentration of Pd became 0.5 wt % to the powder, and was dried, followed by firing at 400° C. for an hour.

The above-described noble metal-supported powder, γ-alumina, a predetermined amount of boehmite, and nitric acid were put into a magnetic pot, and were milled until an average particle diameter of a mixture thereof could reach 3 μm. Thereafter, a slurry of the milled mixture was coated on a cordierite-made honeycomb base member with a volume of 0.119 L (400 cpsi, 6 mil), and excessive slurry was removed therefrom in an airflow, followed by drying at 130° C. and firing at 400° C. for an hour in the air atmosphere. In such a way, a catalyst honeycomb base member of Comparative example 3 was obtained. An amount of the noble metal per 1 L of the catalyst honeycomb at this time was 0.5 g/L—honeycomb.

Comparative Example 4

A catalyst honeycomb base member of Comparative example 4 was obtained in a similar way to Comparative example 3 except that supported noble metal salt was changed to the dinitrodiamine Pt. An amount of the noble metal per 1 L of the catalyst honeycomb at this time was 0.5 g/L—honeycomb.

Comparative Example 5

Unlike Examples 1 to 25, Comparative example 5 is an example where the first compounds in the catalyst powder contain only rare Zr/alumina as a main component.

Into γ-alumina, zirconyl nitrate was impregnated so that Zr component became 3 mol % to the γ-alumina, and then was dried at 130° C., followed by firing at 400° C. Subsequently, a Rh nitrate solution was supported on the obtained powder so that a support concentration of Rh became 0.5 wt % to the powder, and was dried, followed by firing at 400° C. for an hour.

The above-described noble metal-supported powder, γ-alumina, a predetermined amount of boehmite, and nitric acid were put into a magnetic pot, and were milled until an average particle diameter of a mixture thereof could reach 3 μm. Thereafter, a slurry of the milled mixture was coated on a cordierite-made honeycomb base member with a volume of 0.119 L (400 cpsi, 6 mil), and excessive slurry was removed therefrom in an airflow, followed by drying at 130° C. and firing at 400° C. for an hour in the air atmosphere. In such a way, a catalyst honeycomb base member of Comparative example 5 was obtained. An amount of the noble metal per 1 L of the catalyst honeycomb at this time was 0.5 g/L—honeycomb.

[Durability Testing]

The respective catalyst honeycomb base members of Examples 1 to 25 and Comparative examples 1 to 5, which were fabricated in the manner as described above, were mounted on an exhaust system of a V6 engine (displacement: 3.5 L (MPi)) made by Nissan Motor Co., Ltd., and durability testing was conducted therefor, in which a temperature of an inlet of each of the catalyst honeycomb base members was set at 900[° C.], and the engine was driven for 30 hours.

[Early Activation Testing]

The respective catalyst honeycomb base members after being subjected to the above-described durability testing were built in a simulation exhaust gas flow apparatus, a simulation exhaust gas having a composition shown in the following Table 3 was flown through the respective catalyst honeycomb base members, and a temperature of each thereof was raised from 110[° C.] to 500[° C.] at a temperature rise rate of 10° C./min. Then, temperatures at which the HC conversion rate reaches 50% were obtained from HC concentrations on the inlet side and the outlet side, and were used as indices of the low-temperature activation.

TABLE 3

| Gas composition | Stoichiometric |
|---|---|
| Value of Z(−) | 1.000 |
| A/F(−) | 14.5 |
| NO(ppm) | 1000 |
| CO(%) | 0.6 |
| $H_2$(%) | 0.2 |
| $O_2$(%) | 0.6 |
| $CO_2$(%) | 13.9 |
| HC(ppmC) | 1665 |
| $H_2O$(%) | 10 |
| $N_2$(balanced) | Rest of the above |

SV = 60,000 h−1

<Confirmation of Coagulated State of Noble Metal Particle>

In order to investigate a coagulated state of the noble metal particles after the above-described durability testing, the catalyst powders were taken from the catalyst honeycomb base members, and were observed by a TEM. The used TEM is a field emission transmission electron microscope (HF-2000 made by Hitachi, Ltd.), and is attached with an EDX analyzer (SIGMA made by Kevex X-Ray Inc.) as an accessory.

[Testing Results]

Results of the above-described testing are shown in Table 2 together with the compositions and the like of the catalyst honeycombs.

As obvious from Table 2, in the catalyst powders of Examples 1 to 27, the average particle diameters of the noble metals were kept small even after the durability testing, and therefore, the catalyst powders were excellent in the catalytic performance in terms of the low-temperature activation. In particular, Examples 1 to 17 and 19 to 25 in which D2/D1 as the ratio of D2 with respect to D1 was within the range of $1 \leq D2/D1 \leq 50$ were superior to Example 18 in the catalytic performance in terms of the low-temperature activation. Moreover, it was able to be confirmed that no coagulation occurred also by the observation of the noble metal particles by the TEM. As an example, a microscope picture of the structure of Example 9 is as shown in FIG. 4.

As opposed to this, Comparative examples 1 to 5 do not contain the alkali metal, the alkali earth metal, or the zirconia in the first compounds in the catalyst powders, or do not include the second compounds, and accordingly, Comparative examples 1 to 5 were inferior to Examples 1 to 25 in the effect of maintaining the nanometer diameter of the noble metal particles and the catalytic performance in terms of the low-temperature activation.

Next, exhaust gas purifying catalysts of Example 28, Example 29 and Comparative example 6, which have a size suitable for an actual vehicle, were fabricated in the following manner.

Example 28

The Pd catalyst powder of Example 19, the Rh catalyst powder of Example 24, boehmite and a nitric acid solution with a concentration of 10% were mixed, put into a magnetic pot, and milled until an average particle diameter of a mixture thereof could reach 3 [μm]. Slurry thus obtained was coated on a cordierite-made honeycomb base member (0.92 L), and excessive slurry was removed therefrom in an airflow, followed by drying at 130° C. and firing at 400° C. for an hour in the air atmosphere. In such a way, a catalyst honeycomb of Example 28, which had the size suitable for the actual vehicle, was obtained. Amounts of Pd and Rh per 1 L of the catalyst honeycomb at this time were 0.8 g/L and 0.4 g/L, respectively.

Example 29

A catalyst honeycomb of Example 29, which had the size suitable for the actual vehicle, was obtained in a similar way to Example 28 except that the Pd powder used in Example 26 was used instead of the Pd powder of Example 28, and that the Rh powder used in Example 27 was used as Rh powder.

Amounts of the noble metals on the catalyst honeycomb at this time were similar to those of Example 28.

Comparative Example 6

A catalyst honeycomb of Comparative example 6, which had the size suitable for the actual vehicle, was obtained in a similar way to Example 28 except that the Pd powder used in Comparative example 3 was used instead of the Pd powder of Example 28, and that the Rh powder used in Comparative example 5 was used as Rh powder.

Amounts of the noble metals on the catalyst honeycomb at this time were similar to those of Example 28.

[Vehicle Evaluation Testing]

The respective catalyst honeycomb base members of Example 28, Example 29 and Comparative example 6, which had the size suitable for the actual vehicle, were mounted on an exhaust system of an engine of a vehicle, and emission analysis of the exhaust gas was conducted therefor. The vehicle for use in this vehicle evaluation testing was made by Nissan Motor Co., Ltd., and the engine mounted thereon was QE25DE with a displacement of 2.5 [L]. A volume of the honeycomb base member was 0.92 [L]. An evaluation mode was the LA4-cold start mode.

[OSC Amount Measurement Before and After Durability Testing]

The durability testing was conducted for the respective catalyst honeycomb base members of Example 28, Example 29 and Comparative example 6, which had the size suitable for the actual vehicle and were used for the above-described vehicle evaluation testing. OSC amounts of the respective catalyst honeycomb base members before and after the durability testing were individually measured, and the amounts of the oxygen storage capacities of the catalysts after the durability testing were compared with the initial oxygen storage capacities thereof taken as 1.0. In such a way, the durability on OSC of each of the catalysts was evaluated. In the measurement of the OSC amounts, first, the catalyst honeycomb base members before and after the durability testing were partially taken out, the taken catalysts were milled together with the cordierite base members, and the powders before the durability testing and the powders after the durability testing were individually prepared. The respective powders were fired once at 600[° C.] for three hours in an airflow, and organic substances adhered onto the catalysts were removed. Thereafter, a temperature of each catalyst was raised to 600° C. at a rate of 10° C./min in a flow of Hr, and treatment for eliminating oxygen in each catalyst was performed. Thereafter, the respective catalysts were stabilized at 500[° C.], a fixed amount of oxygen was then introduced thereonto at a pulse, and the measurement of the oxygen storage capacities was conducted by a thermal conductivity detector (TCD). Ratios of the initial oxygen storage amounts Qf by the powders before the durability testing and the post-durability oxygen storage amounts Qa by the powders after the durability testing were taken, and the durability of each of the catalysts was confirmed.

Results of the above-mentioned vehicle evaluation testing and the measurement of the OSC amounts before and after the durability testing are shown in Table 4.

TABLE 4

|  | Pd powder | Rh powder | Amount of Pd (g/L) | Amount of Rh (g/L) | Residual ratio of exhaust gas (%) | | | Ratio of post-durability OSC amount to initial |
|---|---|---|---|---|---|---|---|---|
|  |  |  |  |  | HC | CO | NOx | OSC amount |
| Example 23 | Pd(0.5 wt %)/ $Ce_{15}Zr_{85}Ox$/ γ-alumina | Rh(0.5 wt %)/ $Ce_{14}Zr_{85}Pr_1Ox$/ $Ce_3Zr_2$γ-alumina | 0.8 | 0.4 | 2.3% | 9.6% | 10.1% | 72% |
| Example 24 | Pd(0.5 wt %)/ $Ce_{10}Zr_{80}Y_{10}Ox$/ γ-alumina | Rh(0.5 wt %)/ $Ce_{10}Zr_{80}Y_{10}Ox$/ $Ce_3Zr_2$γ-alumina | 0.8 | 0.4 | 2.2% | 7.3% | 7.3% | 97% |
| Comparative example 6 | Pd(0.5 wt %)/ Ce(10)Zr(3)/ γ-alumina | Rh(0.5 wt %)/Zr(3)/ γ-alumina | 0.8 | 0.4 | 10.5% | 26.6% | 23.1% | 37% |

As understood from Table 4, it was verified that, in Examples 28 and 29, residual ratios of the exhaust gas were lower than in Comparative example 6 in the case where the catalysts of Examples 28 and 29 were attached onto the actual vehicle, and the catalysts of Examples 28 and 29 had excellent exhaust gas purifying performance. Moreover, from the measurement results of measuring the OSC amounts before and after the durability testing, it was made obvious that, in Examples 28 and 29, the decrease of the OSCs were less than in Comparative example 6, and Examples 28 and 29 were excellent in the durability. In particular, the catalyst of Example 29, which contained Y, was superior to that of Example 29 in the exhaust gas purifying performance and the durability on OSC in the actual vehicle.

This application is based upon and claims the benefit of priority from Japanese Patent Applications No. 2007-015158 filed on Jan. 25, 2007, No. 2007-112313 filed on Apr. 20, 2007, and No. 2007-237100 filed on Sep. 12, 2007, in the Japanese Patent Office, of which contents are incorporated herein by reference.

As above, the description has been made of the embodiments to which the invention invented by the inventors is applied; however, the present invention is not limited to the description and the drawings, which compose a part of the disclosure of the present invention according to the embodiments. Specifically, what is additionally mentioned is that, naturally, other embodiments, examples, operation technologies, and the like, which will be made by those skilled in the art based on the above-described embodiments, are entirely incorporated in the scope of the present invention.

What is claimed is:

1. An exhaust gas purifying catalyst, comprising:
   noble metal particles;
   first compounds contacting and chemically bonding the noble metal particles to suppress movement of the noble metal particles, the first compounds being a composite oxide containing a rare earth element; and
   second compounds on peripheries of the first compounds on which the noble metal particles are supported, wherein the second compounds contain γ-alumina derived from boehmite,
   wherein a single piece or aggregate of the first compounds which supports a noble metal particle is fixed in a section partitioned from other pieces or aggregates of first compounds by the second compounds, thereby suppressing movement of the noble metal particle and suppressing coagulation of first compounds with each other, and
   wherein D2/D3 as a ratio of a secondary particle diameter (D2) of the first compounds with respect to an average pore diameter (D3) of pores of the second compounds is 1 or more.

2. The exhaust gas purifying catalyst according to claim 1, wherein the composite oxide further contains at least one of alkali metal and alkali earth metal.

3. The exhaust gas purifying catalyst according to claim 1, wherein the composite oxide further contains zirconium.

4. The exhaust gas purifying catalyst according to claim 1, wherein the rare earth element includes at least one selected from the group consisting of La, Ce, Pr and Nd.

5. The exhaust gas purifying catalyst according to claim 1, wherein the rare earth element includes Y.

6. The exhaust gas purifying catalyst according to claim 2 wherein the at least one of alkali metal and alkali earth metal includes at least one selected from the group consisting of Na, K, Rb, Cs, Mg, Ca, Sr and Ba.

7. The exhaust gas purifying catalyst according to claim 1, wherein the noble metal particles include at least one selected from the group consisting of Pt, Pd and Rh.

8. The exhaust gas purifying catalyst according to claim 1, wherein D2/D1 as a ratio of a secondary particle diameter (D2) of the first compounds with respect to a crystallite diameter (D1) of the first compounds is $1 \leq D2/D1 \leq 50$.

9. The exhaust gas purifying catalyst according to claim 8, wherein D2/D1 as the ratio of D2 with respect to D1 is $1 \leq D2/D1 \leq 20$.

10. The exhaust gas purifying catalyst according to claim 7, wherein the noble metal particles are composed of Pd.

11. The exhaust gas purifying catalyst according to claim 1, wherein the second compounds further include at least one element selected from the group consisting of Ce, Zr, La and Ba.

12. The exhaust gas purifying catalyst according to claim 1, wherein a powder pore volume obtained by $N_2$ adsorption analysis is 0.3 [ml/g] to 0.5 [ml/g] per 1 g of powder of the exhaust gas purifying catalyst, and an average pore diameter of the exhaust gas purifying catalyst is 30 [nm] or less.

13. The exhaust gas purifying catalyst according to claim 1, wherein the noble metal particles are contained totally by $8 \times 10^{-20}$ moles or less in the sections partitioned by the second compounds.

14. A method of manufacturing the exhaust gas purifying catalyst according to claim 1, comprising:
   sintering the first compounds in advance, and then supporting the noble metal particles on the first compounds;
   milling the first compounds on which the noble metal particles are supported; and
   forming second compounds on peripheries of the milled first compounds on which the noble metal particles are supported.

15. A catalyst honeycomb base member, wherein the exhaust gas purifying catalyst according to claim 1 is formed by being coated on surfaces of inner walls of a catalyst honeycomb base member.

16. The exhaust gas purifying catalyst according to claim 1, wherein the second compounds consist of γ-alumina derived from boehmite.

17. The exhaust gas purifying catalyst according to claim 1, wherein the second compounds consist of γ-alumina derived from boehmite and cerium.

18. The exhaust gas purifying catalyst according to claim 1, wherein the second compounds consist of γ-alumina derived from boehmite, cerium, zirconium, and lanthanum.

19. The exhaust gas purifying catalyst according to claim 1, wherein the second compounds consist of γ-alumina derived from boehmite, cerium, zirconium, lanthanum, and barium.

20. The exhaust gas purifying catalyst according to claim 1, wherein the second compounds consist of γ-alumina derived from boehmite, cerium, and zirconium.

21. The exhaust gas purifying catalyst according to claim 1, wherein the secondary particle diameter (D2) of the first compounds is an average particle diameter.

* * * * *